United States Patent
Cowden

(10) Patent No.: US 11,440,679 B2
(45) Date of Patent: Sep. 13, 2022

(54) DRONE DOCKING STATION AND DOCKING MODULE

(71) Applicant: Cowden Technologies, LLC, Blacksburg, VA (US)

(72) Inventor: Jason Patrick Cowden, Blacksburg, VA (US)

(73) Assignee: COWDEN TECHNOLOGIES, INC., Blacksburg, VA (US)

(*) Notice: Subject to any disclaimer, the term of this patent is extended or adjusted under 35 U.S.C. 154(b) by 0 days.

(21) Appl. No.: 17/511,991

(22) Filed: Oct. 27, 2021

(65) Prior Publication Data

US 2022/0127014 A1 Apr. 28, 2022

Related U.S. Application Data

(60) Provisional application No. 63/106,194, filed on Oct. 27, 2020.

(51) Int. Cl.
*B64F 1/00* (2006.01)
*B64C 39/02* (2006.01)

(52) U.S. Cl.
CPC ............ *B64F 1/007* (2013.01); *B64C 39/024* (2013.01); *B64C 2201/027* (2013.01); *B64C 2201/042* (2013.01); *B64C 2201/18* (2013.01); *B64C 2201/201* (2013.01)

(58) Field of Classification Search
CPC .......... B64F 1/007; B64F 1/22; B64C 39/024; B64C 2201/027; B64C 2201/042; B64C 2201/18; B64C 2201/201; B64C 2201/066; H02J 50/00; H02J 7/0042; H02J 7/27; H02J 7/0034; Y02T 10/70; Y02T 90/12
See application file for complete search history.

(56) References Cited

U.S. PATENT DOCUMENTS

| | | | | |
|---|---|---|---|---|
| 3,904,156 A | * | 9/1975 | Smith | B64D 1/22 244/3 |
| 3,994,451 A | * | 11/1976 | Cole | B64C 3/48 244/214 |
| 5,292,165 A | * | 3/1994 | Wiklund | B66C 1/38 294/82.2 |

(Continued)

FOREIGN PATENT DOCUMENTS

| | | |
|---|---|---|
| EP | 2976687 B1 | 9/2017 |
| WO | 2015108588 A3 | 7/2015 |

(Continued)

OTHER PUBLICATIONS

Drone-related technology found at https://coex.tech/, visited on Dec. 7, 2021.

(Continued)

*Primary Examiner* — Medhat Badawi
(74) *Attorney, Agent, or Firm* — Woods Rogers Vandeventer Black; Nathan Evans; Timothy Bechen

(57) ABSTRACT

A mechanically secure docking platform for unmanned VTOL aircraft ("drone") or other automated vehicle, acting as an automated battery recharging system for drones or a battery quick change system for drones. The system also is capable of enabling an automated data logistics system for drones, an autonomous guidance system for landing and docking for drones, and/or an autonomous guidance system for undocking and takeoff for drones.

15 Claims, 8 Drawing Sheets

(56) References Cited

U.S. PATENT DOCUMENTS

| | | | | |
|---|---|---|---|---|
| 7,673,831 | B2* | 3/2010 | Steele | B64D 3/02 244/1 TD |
| 8,245,370 | B2* | 8/2012 | Ritter | B64G 1/646 24/664 |
| 8,418,959 | B2* | 4/2013 | Kang | B64C 39/024 244/116 |
| 8,523,253 | B1* | 9/2013 | Yustus | B66C 1/36 294/82.21 |
| 8,890,480 | B2* | 11/2014 | Vian | G01R 31/3647 324/426 |
| 9,051,043 | B1* | 6/2015 | Peeters | H04L 67/12 |
| 9,056,556 | B1* | 6/2015 | Hyde | B60L 58/19 |
| 9,056,676 | B1* | 6/2015 | Wang | B60R 9/00 |
| 9,075,415 | B2* | 7/2015 | Kugelmass | H04L 67/12 |
| 9,139,310 | B1* | 9/2015 | Wang | B64C 39/024 |
| 9,205,922 | B1* | 12/2015 | Bouwer | B64C 37/02 |
| 9,244,147 | B1* | 1/2016 | Soundararajan | G01S 1/08 |
| 9,280,038 | B1* | 3/2016 | Pan | F16M 11/2064 |
| 9,310,518 | B2* | 4/2016 | Haas | G06T 7/292 |
| 9,363,008 | B2* | 6/2016 | Boss | H04M 15/68 |
| 9,387,928 | B1 | 7/2016 | Gentry et al. | |
| 9,387,940 | B2* | 7/2016 | Godzdanker | B64F 1/28 |
| 9,420,562 | B1* | 8/2016 | Cai | H04W 4/029 |
| 9,422,139 | B1* | 8/2016 | Bialkowski | B64C 39/024 |
| 9,460,616 | B1* | 10/2016 | Miyahira | G08G 1/0967 |
| 9,463,875 | B2* | 10/2016 | Abuelsaad | G08G 1/166 |
| 9,471,064 | B1* | 10/2016 | Boland | G06N 20/00 |
| 9,505,493 | B2 | 11/2016 | Borko | |
| 9,561,852 | B1* | 2/2017 | Beaman | B64C 39/024 |
| 9,576,482 | B2* | 2/2017 | Yamamoto | H04W 4/027 |
| 9,594,372 | B1* | 3/2017 | Sills | G01C 21/3652 |
| 9,637,233 | B2* | 5/2017 | Bivens | B64C 39/024 |
| 9,651,945 | B1* | 5/2017 | Erickson | G08G 5/0043 |
| 9,659,503 | B2* | 5/2017 | Gordon | G08G 5/0069 |
| 9,676,481 | B1* | 6/2017 | Buchmueller | B64D 1/22 |
| 9,688,404 | B1* | 6/2017 | Buchmueller | B64C 39/024 |
| 9,702,830 | B1* | 7/2017 | Akselrod | G01N 21/95607 |
| 9,908,618 | B2* | 3/2018 | Vaughn | B64C 27/08 |
| 9,928,474 | B1* | 3/2018 | Evans | G06Q 10/083 |
| 9,957,048 | B2* | 5/2018 | Gil | G08G 5/006 |
| 10,000,285 | B2* | 6/2018 | Shannon | B64D 1/22 |
| 10,040,551 | B2* | 8/2018 | Erickson | A47J 36/28 |
| 10,040,552 | B2* | 8/2018 | Gordon | G06Q 10/0832 |
| 10,043,398 | B2* | 8/2018 | Akselrod | G08G 5/0091 |
| 10,071,804 | B1* | 9/2018 | Buchmueller | B64D 1/12 |
| 10,182,215 | B1* | 1/2019 | Jacob | H04N 7/185 |
| 10,207,820 | B2* | 2/2019 | Sullivan | B64F 3/00 |
| 10,239,638 | B1* | 3/2019 | Cohen | B64F 1/22 |
| 10,287,014 | B2* | 5/2019 | Erickson | B60L 53/305 |
| 10,364,030 | B2* | 7/2019 | Prager | B64D 1/22 |
| 10,407,182 | B1* | 9/2019 | Alcorn | B64F 1/125 |
| 10,457,421 | B2 | 10/2019 | O'Toole | |
| 10,476,614 | B1* | 11/2019 | Brinkoetter | H04B 17/18 |
| 10,507,920 | B2* | 12/2019 | Waltner | F16F 9/067 |
| 10,543,984 | B1* | 1/2020 | Alduaiji | B65G 65/005 |
| 10,668,997 | B2* | 6/2020 | Moses | B64D 1/22 |
| 10,689,107 | B2* | 6/2020 | Baracaldo Angel | G08B 25/10 |
| 10,762,926 | B2 | 9/2020 | Goodman et al. | |
| 10,789,567 | B1* | 9/2020 | Ur | G06Q 10/08355 |
| 10,793,274 | B2* | 10/2020 | Prager | B64C 39/02 |
| 10,899,111 | B2* | 1/2021 | Penning | B32B 15/09 |
| 10,899,119 | B2* | 1/2021 | Lindstedt | B32B 27/34 |
| 10,899,444 | B2* | 1/2021 | Blomberg | B64C 39/024 |
| 10,899,449 | B2* | 1/2021 | Luckay | G05D 1/0676 |
| 10,922,983 | B2* | 2/2021 | Blomberg | G01W 1/10 |
| 10,934,019 | B2 | 3/2021 | Stamatovski | |
| 11,006,975 | B1* | 5/2021 | Cohen | A61B 17/3421 |
| 11,040,768 | B2* | 6/2021 | Bailly | B64C 17/02 |
| 11,046,459 | B2* | 6/2021 | Stamatovski | B64F 1/007 |
| 2002/0156645 | A1* | 10/2002 | Hansen | G06Q 30/0601 705/26.1 |
| 2007/0051292 | A1* | 3/2007 | Kilbourn | B63H 9/061 114/311 |
| 2008/0087762 | A1* | 4/2008 | Holloman | B64C 1/0009 244/30 |
| 2009/0012923 | A1* | 1/2009 | Moses | G06Q 10/10 706/46 |
| 2009/0152391 | A1* | 6/2009 | McWhirk | B64B 1/70 244/30 |
| 2009/0306840 | A1 | 12/2009 | Blenkhorn et al. | |
| 2011/0192932 | A1* | 8/2011 | Brenner | B64D 1/22 244/17.13 |
| 2012/0242275 | A1* | 9/2012 | Kokusho | H02S 20/00 136/246 |
| 2012/0271491 | A1* | 10/2012 | Spata | G05D 1/102 701/1 |
| 2013/0059626 | A1* | 3/2013 | Hopkins | H04W 36/08 455/552.1 |
| 2013/0068153 | A1* | 3/2013 | Hine | B63H 19/02 114/337 |
| 2013/0233964 | A1* | 9/2013 | Woodworth | B64C 25/58 244/175 |
| 2013/0238135 | A1* | 9/2013 | Fisher | B66D 1/485 254/290 |
| 2014/0032034 | A1* | 1/2014 | Raptopoulos | H04B 7/18506 701/25 |
| 2014/0149244 | A1* | 5/2014 | Abhyanker | G06Q 30/0605 705/26.2 |
| 2014/0163664 | A1* | 6/2014 | Goldsmith | A61B 17/0057 604/93.01 |
| 2014/0236390 | A1* | 8/2014 | Mohamadi | B64D 47/08 701/16 |
| 2014/0254896 | A1* | 9/2014 | Zhou | G06Q 20/40145 705/16 |
| 2014/0263823 | A1* | 9/2014 | Wang | B64C 27/08 244/17.23 |
| 2014/0293432 | A1* | 10/2014 | Takemoto | H04N 9/3158 353/121 |
| 2015/0035437 | A1* | 2/2015 | Panopoulos | F21S 8/085 315/291 |
| 2015/0069968 | A1* | 3/2015 | Pounds | B60L 53/16 320/109 |
| 2015/0076287 | A1* | 3/2015 | Dula | B64G 1/244 244/158.2 |
| 2015/0120094 | A1* | 4/2015 | Kimchi | G06Q 30/0641 701/3 |
| 2015/0154559 | A1* | 6/2015 | Barbush | G06Q 10/047 705/338 |
| 2015/0158587 | A1* | 6/2015 | Patrick | B64D 1/22 701/3 |
| 2015/0158599 | A1* | 6/2015 | Sisko | B64F 1/20 244/114 R |
| 2015/0178649 | A1* | 6/2015 | Furman | G06Q 10/06312 705/7.22 |
| 2015/0183528 | A1* | 7/2015 | Walsh | A47G 29/141 244/114 R |
| 2015/0183615 | A1* | 7/2015 | Vander Lind | B65H 75/265 242/478.1 |
| 2015/0259078 | A1* | 9/2015 | Filipovic | G08B 13/19632 244/114 R |
| 2015/0284076 | A1* | 10/2015 | Cacciaguera | B64C 1/26 244/6 |
| 2015/0284079 | A1* | 10/2015 | Matsuda | B64C 39/024 244/7 A |
| 2015/0286216 | A1* | 10/2015 | Miwa | G05B 6/02 701/4 |
| 2015/0323932 | A1* | 11/2015 | Paduano | G06Q 50/28 701/3 |
| 2015/0336667 | A1* | 11/2015 | Srivastava | G05D 1/101 701/2 |
| 2015/0363843 | A1* | 12/2015 | Loppatto | G06Q 30/0283 705/330 |
| 2015/0370251 | A1* | 12/2015 | Siegel | B64C 39/024 701/2 |
| 2015/0375398 | A1* | 12/2015 | Penn | B25J 5/005 700/218 |
| 2016/0003637 | A1* | 1/2016 | Andersen | H04L 12/1827 701/519 |

(56) References Cited

U.S. PATENT DOCUMENTS

| | | | |
|---|---|---|---|
| 2016/0009392 A1* | 1/2016 | Korhonen | B64C 39/024 244/137.3 |
| 2016/0011592 A1* | 1/2016 | Zhang | G01S 13/885 244/114 R |
| 2016/0016652 A1* | 1/2016 | Barrett | A63H 27/12 244/15 |
| 2016/0016664 A1* | 1/2016 | Basuni | B60L 50/90 244/17.13 |
| 2016/0023743 A1* | 1/2016 | Barrett | G09F 21/08 244/119 |
| 2016/0033966 A1* | 2/2016 | Farris | A47G 29/122 701/16 |
| 2016/0039300 A1* | 2/2016 | Wang | B64F 1/007 244/58 |
| 2016/0039541 A1* | 2/2016 | Beardsley | G05D 1/042 701/2 |
| 2016/0048131 A1* | 2/2016 | Lesperance | G05D 1/102 701/8 |
| 2016/0059938 A1* | 3/2016 | Momayez | H02S 10/40 440/49 |
| 2016/0059963 A1* | 3/2016 | Burgess | B64D 9/00 701/49 |
| 2016/0068264 A1* | 3/2016 | Ganesh | G06Q 10/083 701/4 |
| 2016/0068265 A1* | 3/2016 | Hoareau | G06Q 10/083 701/3 |
| 2016/0068267 A1* | 3/2016 | Liu | G05D 1/0088 701/4 |
| 2016/0086494 A1* | 3/2016 | Anandayuvaraj | G08G 5/0056 701/3 |
| 2016/0096622 A1* | 4/2016 | Richardson | B64C 39/024 701/2 |
| 2016/0101874 A1* | 4/2016 | McKinnon | A47G 29/14 244/114 R |
| 2016/0107750 A1* | 4/2016 | Yates | B64C 39/024 244/2 |
| 2016/0114887 A1* | 4/2016 | Zhou | G06Q 20/367 348/148 |
| 2016/0115702 A1* | 4/2016 | Nordbruch | G05D 1/0297 414/231 |
| 2016/0130000 A1* | 5/2016 | Rimanelli | B64C 39/024 244/2 |
| 2016/0131025 A1* | 5/2016 | Pekrul | F02B 53/10 123/205 |
| 2016/0131026 A1* | 5/2016 | Pekrul | F01C 21/0836 123/205 |
| 2016/0137293 A1* | 5/2016 | Santangelo | B64C 39/024 244/50 |
| 2016/0137304 A1* | 5/2016 | Phan | B64D 33/08 244/17.23 |
| 2016/0140496 A1* | 5/2016 | Simms | G08G 5/0069 705/337 |
| 2016/0140851 A1* | 5/2016 | Levy | G08G 5/0034 701/410 |
| 2016/0144734 A1* | 5/2016 | Wang | B64C 39/024 701/17 |
| 2016/0144982 A1* | 5/2016 | Sugumaran | B64C 25/32 244/108 |
| 2016/0157653 A1* | 6/2016 | Manitta | A47G 29/12095 232/27 |
| 2016/0159472 A1* | 6/2016 | Chan | B64C 27/54 244/39 |
| 2016/0163205 A1* | 6/2016 | Jenkins | G08G 5/0069 701/3 |
| 2016/0167778 A1* | 6/2016 | Meringer | B64C 27/10 244/17.11 |
| 2016/0185466 A1* | 6/2016 | Dreano, Jr. | G06Q 10/083 705/26.81 |
| 2016/0189101 A1* | 6/2016 | Kantor | G08G 5/0013 705/338 |
| 2016/0189549 A1* | 6/2016 | Marcus | G08G 5/0039 701/3 |
| 2016/0194959 A1* | 7/2016 | Pekrul | F01C 19/06 418/146 |
| 2016/0196756 A1* | 7/2016 | Prakash | G08G 5/025 701/3 |
| 2016/0200207 A1* | 7/2016 | Lee | B64C 25/32 244/17.23 |
| 2016/0200438 A1* | 7/2016 | Bokeno | B64F 1/362 244/2 |
| 2016/0207627 A1* | 7/2016 | Hoareau | B64D 1/02 |
| 2016/0209839 A1* | 7/2016 | Hoareau | G08G 5/0091 |
| 2016/0214713 A1* | 7/2016 | Cragg | B64C 39/024 |
| 2016/0214714 A1* | 7/2016 | Sekelsky | B60L 53/32 |
| 2016/0214717 A1* | 7/2016 | De Silva | B64D 5/00 |
| 2016/0221186 A1* | 8/2016 | Perrone | B25J 9/1661 |
| 2016/0221683 A1* | 8/2016 | Roberts | B64D 27/02 |
| 2016/0225263 A1* | 8/2016 | Salentiny | G08G 5/0039 |
| 2016/0229299 A1* | 8/2016 | Streett | G05D 1/0011 |
| 2016/0229534 A1* | 8/2016 | Hutson | B64C 39/024 |
| 2016/0236778 A1* | 8/2016 | Takayama | B64D 1/12 |
| 2016/0239798 A1* | 8/2016 | Borley | G06Q 10/0833 |
| 2016/0244162 A1* | 8/2016 | Weller | B64C 39/024 |
| 2016/0244187 A1* | 8/2016 | Byers | B64D 1/00 |
| 2016/0253908 A1* | 9/2016 | Chambers | G08G 5/006 701/2 |
| 2016/0257423 A1* | 9/2016 | Martin | B64C 39/024 |
| 2016/0257424 A1* | 9/2016 | Stabler | B64F 1/20 |
| 2016/0257426 A1* | 9/2016 | Mozer | B64F 1/362 |
| 2016/0266579 A1* | 9/2016 | Chen | G08G 5/0078 |
| 2016/0272308 A1* | 9/2016 | Gentry | G05D 1/102 |
| 2016/0272312 A1* | 9/2016 | Mallard | B64C 29/0033 |
| 2016/0280075 A1* | 9/2016 | McGrady | B64D 27/24 |
| 2016/0280371 A1* | 9/2016 | Canavor | H04L 9/3247 |
| 2016/0297521 A1* | 10/2016 | Cheatham, III | B64C 39/024 |
| 2016/0300493 A1* | 10/2016 | Ubhi | G08G 5/0034 |
| 2016/0300496 A1* | 10/2016 | Cheatham, III | G08G 5/0013 |
| 2016/0304198 A1* | 10/2016 | Jourdan | G08G 5/045 |
| 2016/0304217 A1* | 10/2016 | Fisher | B60L 53/51 |
| 2016/0307449 A1* | 10/2016 | Gordon | G05D 1/106 |
| 2016/0311329 A1* | 10/2016 | Rodriguez | H02J 7/0042 |
| 2016/0311529 A1* | 10/2016 | Brotherton-Ratcliffe | B64C 27/30 |
| 2016/0320773 A1* | 11/2016 | Skaaksrud | H04W 4/80 |
| 2016/0338274 A1* | 11/2016 | Messner | A01G 25/16 |
| 2016/0340006 A1* | 11/2016 | Tang | B64C 39/024 |
| 2016/0340038 A1* | 11/2016 | Chavez | B64D 47/08 |
| 2016/0364989 A1* | 12/2016 | Speasl | G08G 5/0034 |
| 2016/0376004 A1* | 12/2016 | Claridge | B64C 39/024 701/3 |
| 2017/0015415 A1* | 1/2017 | Chan | B60L 53/65 |
| 2017/0021923 A1* | 1/2017 | Fisher | B64F 1/12 |
| 2017/0023949 A1* | 1/2017 | Fisher | B64F 1/005 |
| 2017/0025022 A1* | 1/2017 | Henry | H04W 4/029 |
| 2017/0050749 A1* | 2/2017 | Pilskalns | B64F 1/362 |
| 2017/0073071 A1* | 3/2017 | Salzmann | G05D 1/0038 |
| 2017/0074666 A1* | 3/2017 | Kobayashi | G06F 16/951 |
| 2017/0081043 A1* | 3/2017 | Jones | B64C 37/02 |
| 2017/0096075 A1* | 4/2017 | Henry | B64F 1/007 |
| 2017/0096222 A1* | 4/2017 | Spinelli | B64C 33/00 |
| 2017/0097260 A1* | 4/2017 | Nagashima | G01S 7/4817 |
| 2017/0121023 A1* | 5/2017 | High | B64D 9/00 |
| 2017/0129603 A1* | 5/2017 | Raptopoulos | G08G 5/0069 |
| 2017/0129749 A1* | 5/2017 | Rodríguez Mijangos | B66C 13/06 |
| 2017/0132558 A1* | 5/2017 | Perez | G06Q 10/083 |
| 2017/0132562 A1* | 5/2017 | High | B64B 1/40 |
| 2017/0144776 A1* | 5/2017 | Fisher | B64F 1/24 |
| 2017/0217323 A1* | 8/2017 | Antonini | B64C 39/024 |
| 2017/0240062 A1* | 8/2017 | Jaiswal | G01S 13/913 |
| 2017/0253349 A1* | 9/2017 | Wang | B64F 1/02 |
| 2017/0283090 A1* | 10/2017 | Miller | B64C 39/024 |
| 2017/0308850 A1* | 10/2017 | Roush | G06Q 10/08355 |
| 2017/0313421 A1* | 11/2017 | Gil | G06Q 10/0832 |
| 2017/0313422 A1* | 11/2017 | Gil | B64D 45/04 |
| 2017/0334561 A1* | 11/2017 | Sopper | B66D 5/026 |
| 2017/0337511 A1* | 11/2017 | Shroff | H04W 4/029 |
| 2017/0344000 A1* | 11/2017 | Krishnamoorthy | G08G 5/0013 |
| 2017/0372256 A1* | 12/2017 | Kantor | G08G 5/0043 |
| 2018/0000196 A1* | 1/2018 | Lovell | A43B 7/1425 |

(56) References Cited

U.S. PATENT DOCUMENTS

| | | | |
|---|---|---|---|
| 2018/0039286 A1* | 2/2018 | Tirpak | G05D 1/042 |
| 2018/0043782 A1* | 2/2018 | Ng | B60L 53/12 |
| 2018/0056794 A1* | 3/2018 | Kim | B60L 53/126 |
| 2018/0068494 A1* | 3/2018 | Hamilton | G07C 5/006 |
| 2018/0072416 A1* | 3/2018 | Cantrell | G05D 1/104 |
| 2018/0074523 A1* | 3/2018 | Cantrell | B60L 53/68 |
| 2018/0092345 A1* | 4/2018 | Okumura | F41G 3/14 |
| 2018/0118340 A1* | 5/2018 | Russo | B64C 39/024 |
| 2018/0134388 A1* | 5/2018 | Gil | G08G 5/025 |
| 2018/0149137 A1* | 5/2018 | Nordstrom | B64F 3/00 |
| 2018/0155027 A1* | 6/2018 | Gil | B64D 1/00 |
| 2018/0155028 A1* | 6/2018 | Gil | H04W 4/70 |
| 2018/0155029 A1* | 6/2018 | Gil | H04W 4/70 |
| 2018/0155030 A1* | 6/2018 | Gil | B65G 1/06 |
| 2018/0155031 A1* | 6/2018 | Gil | B64D 45/04 |
| 2018/0155032 A1* | 6/2018 | Gil | G01S 19/42 |
| 2018/0229852 A1* | 8/2018 | Boss | B60L 53/14 |
| 2018/0237161 A1* | 8/2018 | Minnick | B64F 1/007 |
| 2018/0291579 A1* | 10/2018 | Gharabegian | E01H 5/106 |
| 2018/0312255 A1* | 11/2018 | Illuminati | B64C 39/024 |
| 2018/0312276 A1* | 11/2018 | Miller | B64C 31/06 |
| 2018/0349840 A1* | 12/2018 | Gil | G08G 5/025 |
| 2018/0366955 A1* | 12/2018 | Rikoski | H02J 7/00047 |
| 2019/0023113 A1* | 1/2019 | Stoltz | B60T 1/06 |
| 2019/0071176 A1* | 3/2019 | von Flotow | B66D 1/46 |
| 2019/0100108 A1* | 4/2019 | Davis | H02J 50/00 |
| 2019/0122172 A1* | 4/2019 | Gil | E05F 15/77 |
| 2019/0161190 A1* | 5/2019 | Gil | B65G 1/0435 |
| 2019/0193855 A1* | 6/2019 | Prager | B64C 39/024 |
| 2019/0193856 A1* | 6/2019 | Prager | B64C 39/024 |
| 2019/0193952 A1* | 6/2019 | Zevenbergen | B65G 47/91 |
| 2019/0196512 A1* | 6/2019 | Blake | G05D 1/104 |
| 2019/0197643 A1* | 6/2019 | Cochran | G06Q 10/06393 |
| 2019/0233254 A1* | 8/2019 | Shin | H01F 7/06 |
| 2019/0245365 A1* | 8/2019 | Farrahi Moghaddam | H02J 7/0044 |
| 2019/0247050 A1* | 8/2019 | Goldsmith | A61F 2/82 |
| 2019/0276140 A1* | 9/2019 | Poltorak | B64D 1/22 |
| 2019/0291961 A1* | 9/2019 | Urban | B64C 39/024 |
| 2019/0315235 A1* | 10/2019 | Kung | B64C 39/024 |
| 2019/0326764 A1* | 10/2019 | Gu | H02J 7/00714 |
| 2019/0340569 A1* | 11/2019 | Prager | B64C 39/024 |
| 2019/0348862 A1* | 11/2019 | Obayashi | B60L 53/38 |
| 2019/0383917 A1* | 12/2019 | Shinozuka | G01C 3/06 |
| 2020/0039367 A1* | 2/2020 | Lyden | B60L 53/51 |
| 2020/0039643 A1* | 2/2020 | Fuller | B64C 39/022 |
| 2020/0044453 A1* | 2/2020 | Lyden | H02J 3/383 |
| 2020/0055613 A1* | 2/2020 | Miller | G05D 1/0676 |
| 2020/0130864 A1* | 4/2020 | Brockers | B60L 53/37 |
| 2020/0140245 A1* | 5/2020 | Yasuda | B66C 23/208 |
| 2020/0148322 A1* | 5/2020 | Pekrul | B63H 5/02 |
| 2020/0262550 A1* | 8/2020 | Dailey | B64D 17/80 |
| 2020/0288895 A1* | 9/2020 | Bennet | A47G 29/141 |
| 2020/0346736 A1* | 11/2020 | Krasnoff | B64C 29/0033 |
| 2021/0066913 A1* | 3/2021 | Syracuse | H02J 7/0047 |
| 2021/0125503 A1* | 4/2021 | Henry | G05D 1/0038 |
| 2021/0148131 A1* | 5/2021 | Wankewycz | H02J 7/00 |
| 2021/0171218 A1* | 6/2021 | Scherz | B64F 1/364 |
| 2021/0173414 A1* | 6/2021 | Starr | B64D 9/00 |

FOREIGN PATENT DOCUMENTS

| | | |
|---|---|---|
| WO | 2017065411 A1 | 4/2017 |
| WO | 2017109780 A1 | 6/2017 |

OTHER PUBLICATIONS

Drone-related technology found at http://www.edronic.com/, visited on Dec. 7, 2021.

Drone-related technology found at https://www.heishatech.com/, visited on Dec. 7, 2021.

* cited by examiner

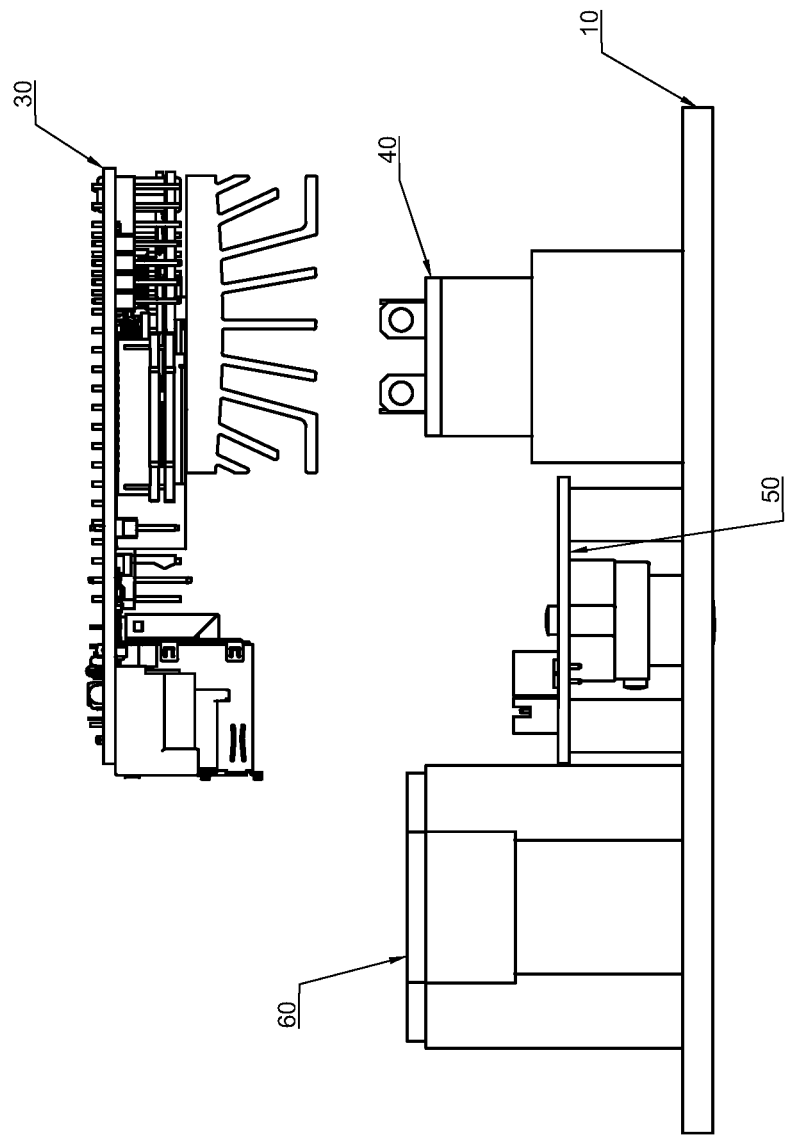

DRONE DOCKING STATION AND DOCKING MODULE

CROSS-REFERENCE TO RELATED APPLICATION

The present application relies on the disclosures of and claims priority to and the benefit of the filing date of the following U.S. Provisional Patent Application:
U.S. Patent Application No. 63/106,194, filed Oct. 27, 2020.
The disclosures of that application are hereby incorporated by reference herein in their entireties.

BACKGROUND

Field of the Invention

While the use of Unmanned Aircraft Systems (UAS) is becoming more widespread and the scenarios in which they are being applied continues to grow, there are still many critical gaps that need to be addressed to enable drones to operate continuously in diverse and remote environments. The presently disclosed invention addresses at least the following problems for drones, including those already in production use, by, in aspects, retrofitting the drone with a module that serves as a docking mechanism, as well as a housing for an onboard computer with attached sensors. In other cases, the invention teaches fabricating drones with these capabilities, as opposed to retrofitting them. First, in embodiments, an onboard computer will be interfaced with the drone's autopilot in order to issue guidance commands for an autonomous docking procedure. Second, in embodiments, once the drone is docked with the docking platform, a secure mechanical connection is made in order to lock the drone into place. Third, in embodiments, when the drone is locked into place a power connection is made in order to facilitate recharging of the drone's batteries. Fourth, in embodiments, when the drone is locked into place, a data connection is made in order to facilitate the data handling logistics of high-density data to, in aspects, another storage device. Fifth, in embodiments, when the drone is locked or positioned into place, a coupling or loading mechanism will interface with the drone's payload delivery system in order to fully or completely replenish the drone's payload. The docking platform may house a battery charger capable of recharging the drone's battery system, networking equipment for handling data logistics, a dedicated computer for monitoring power and data transfer, a storage container for holding the solid, liquid, or gas that will be used to refill the drone's payload delivery system, the custom mechatronic coupling mechanism that will be used to secure the drone in place as well as making the connections to both the battery charger and the data uplink, or combinations thereof. This coupling mechanism, in aspects, may comprise one or more actuators to create the mechanical connection between the drone and platform. The platform computer may be capable of governing the automated operation of this locking mechanism.

The present invention is a mechanically secure docking platform, in aspects, for unmanned VTOL ("vertical takeoff and landing") aircraft ("drone") or other automated vehicle. In aspects, the present invention is an automated battery recharging system for drones and, in cases, a battery quick-change system for drones. In embodiments, the present invention is also an automated data logistics system for drones, an autonomous guidance system for landing and docking for drones, and/or an autonomous guidance system for undocking and takeoff for drones. In embodiments, the present invention is also a payload refilling station for drones, in cases, for solid, liquid, or gaseous payloads. In embodiments, the present invention is able to be retrofitted to existing drones to manage power, data transfer, replenish payload, and the interface with the drone's autopilot. In other aspects, the present invention is able to be scaled to larger drones.

In embodiments, the present invention is able to land softly to minimize the impact of repeated dockings. Thus, in a preferred embodiment, the invention is a system that can, in aspects, be retrofitted to existing drones to allow them to autonomously dock, recharge, handle data, replenish payload, securely lock to the platform, then depart. This will enable drones to continuously or nearly-continuously operate in, for example, remote and unsafe environments without human supervision, although it is not limited to such environments.

Description of the Related Art

WO2017065411A1 provides a simplistic platform for the drone to land on where the rechargeable battery makes a wireless connection.

WO2017109780A1 uses a "spring-loaded pogo pin" mechanism that is configured for closing a circuit to transfer power to a rechargeable battery.

However, a major limitation of multirotor drones is the flight time provided by current consumer-level battery technology. If a drone needed to be used for an autonomous mission or task, the work that could be done would be limited to 15-60 minutes before requiring human intervention to change the batteries. As the need continues to grow for drones, autonomous applications such as mapping, monitoring, search and rescue, and package delivery can benefit from automated battery charging.

Therefore, while a few existing drone charging platforms do exist as noted, in part, herein, there are several characteristics that make these solutions less than ideal. Most of these limited solutions require a pilot in the loop to perform a manual landing. Some of the more automated solutions have a large degree of error associated with the position of the drone when landing. Most teach a landing surface where most aircraft will strike the platform with a high enough velocity to create maintenance issues for the charging plates located on the feet of the drone. Accordingly, a need exists for an improved drone landing, charging, and data transfer system.

SUMMARY OF THE INVENTION

In one embodiment of the present invention, a system is provided that facilitates the autonomous docking and undocking of a drone with a docking platform. In another embodiment of the present invention, a system is provided that automatically initiates and completes the charging of a battery used by a docked robotic system, including a drone. In another embodiment of the present invention, a system is provided that automatically initiates and completes the moving of data (e.g., uploading to and/or from, and/or downloading to and/or from) between a docked robotic system, such as a drone, to another data storage system. In another embodiment of the present invention, a system is provided that automatically initiates and completes the replenishing of a payload used by a docked robotic system, including a drone. Thus, in examples, information from the drone can be shared with the docking station or information can be sent to the drone from the docking station. In other aspects, information from another electronic device, such as a computer, computer processing unit, smartphone, phone, server, internet, or cloud, can be shared with the docking station and then to the drone and/or can be shared with the drone and then to the docking station, and variations of such data sharing.

In yet another embodiment of the present invention, a system is provided that will mechanically secure a docked drone to the docking platform to enable functionality described herein.

BRIEF DESCRIPTION OF THE DRAWINGS

The accompanying drawings illustrate certain aspects of some of the embodiments of the present invention, and should not be used to limit or define the invention. Together with the written description the drawings serve to explain certain principles of the invention.

FIG. 2 is a schematic showing the interior of the computerized docking module (10). The onboard computer (30) can be mounted, in aspects, to the top of the docking module (10). A double pole double throw relay (40) can be used for charging the drone's onboard battery system, and the double pole double throw relay (40) can be mounted, in aspects, on the bottom of the docking module (10). A monoscopic or stereoscopic camera (50) that interfaces with the onboard computer (30) can be mounted, in aspects, on the bottom of the docking module (10). An optical distance measurement sensor (60) that interfaces with the onboard computer (30) can be mounted, in aspects, on the bottom of the docking module (10).

FIG. 3 additionally illustrates one embodiment of a ferrous material 130 strip along the bottom.

FIG. 4 further illustrates one embodiment of linear actuators (70), also referred herein as securing mechanisms. At least one of the linear actuators (70) include a charger (72) and a data connector (74). The charger (72) includes a power cable (76), in this embodiment disposed within the actuator (70). The data connector (74) includes a network cable (78), in this embodiment disposed within the actuator (70). Additionally, the charger (72) transfers power via the power cable (76) via an internal battery or power source (82) within the platform (20) Additionally illustrated, the platform (20) includes an onboard computer 84 or computing device or devices managing docking operations as noted herein.

DETAILED DESCRIPTION

Figure 1A:
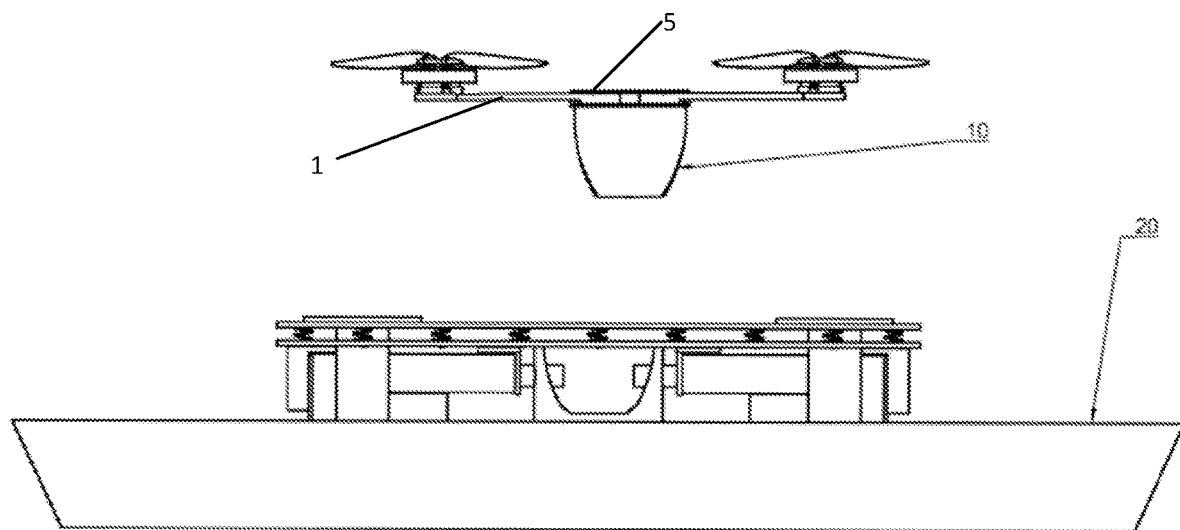
FIG. 1A is a schematic showing a drone (1) with an attached computerized docking module (10) above a docking platform (20) that may or may not provide a mechanical enclosure to cover the drone (1) during docking. Also indicated, the drone (1) includes a battery (5) providing power for flying operations.
Figure 1B:
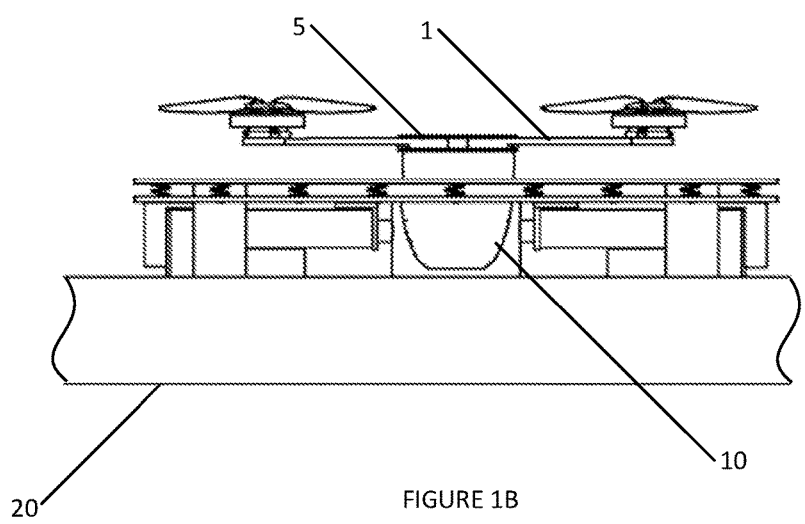
FIG. 1B is a schematic showing the mating of the docking module (10) of the drone (1), including battery (5) with the docking platform (20).
Figure 3:
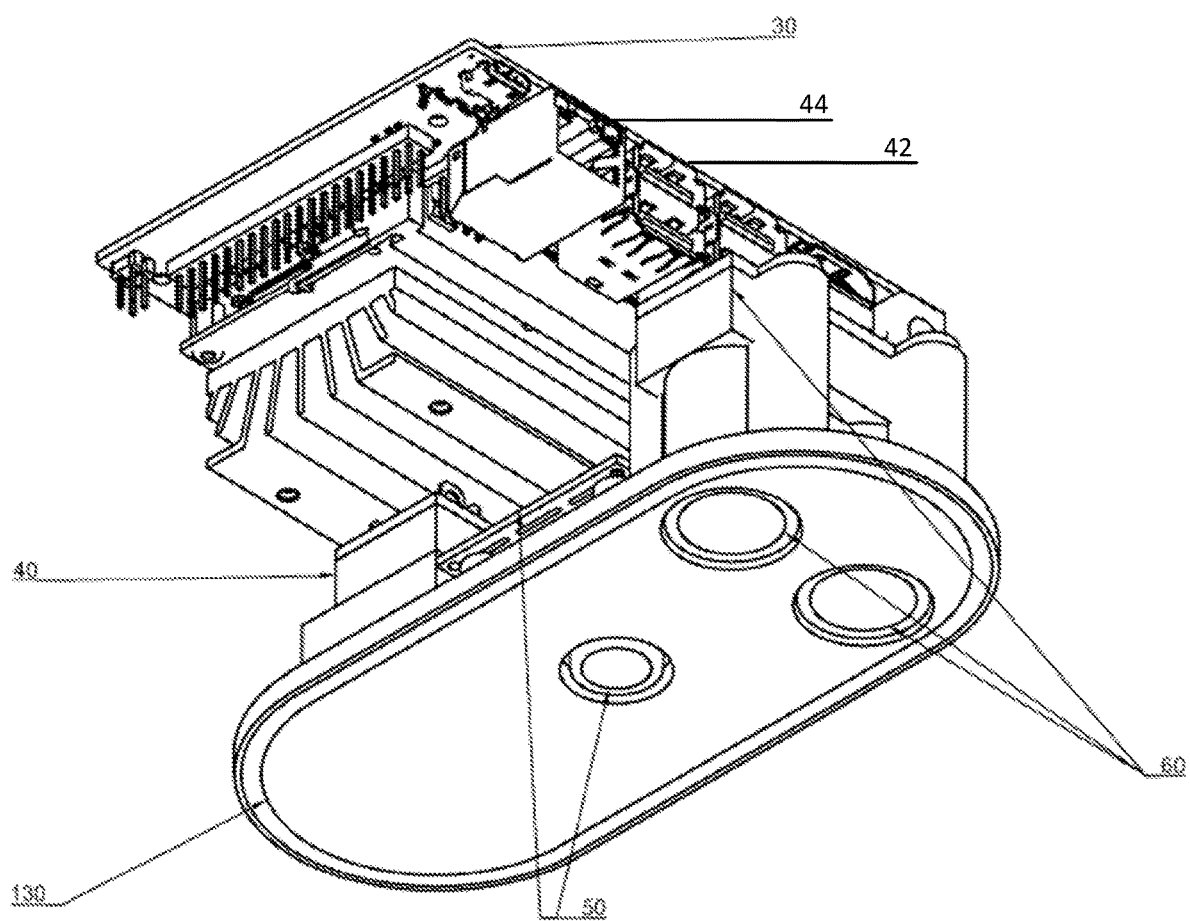
FIG. 3 is a schematic showing the exposed interior of the computerized docking module (10) as well as the bottom faceplate of the docking module and the double pole double throw relay (40). The computer and electronics as described in FIG. 2 remain; however, this figure further shows cutouts for a monoscopic camera (50) and an optical distance measurement sensor (60) on the bottom of the docking module (10). A stereoscopic or other camera is also envisioned by the current invention. The onboard computer (30) includes a charging port (42) capable of connecting with a docking platform charging device. The onboard computer (30) includes a data connection port (44) capable of connecting with a data connector of the docking platform.
Figure 4:
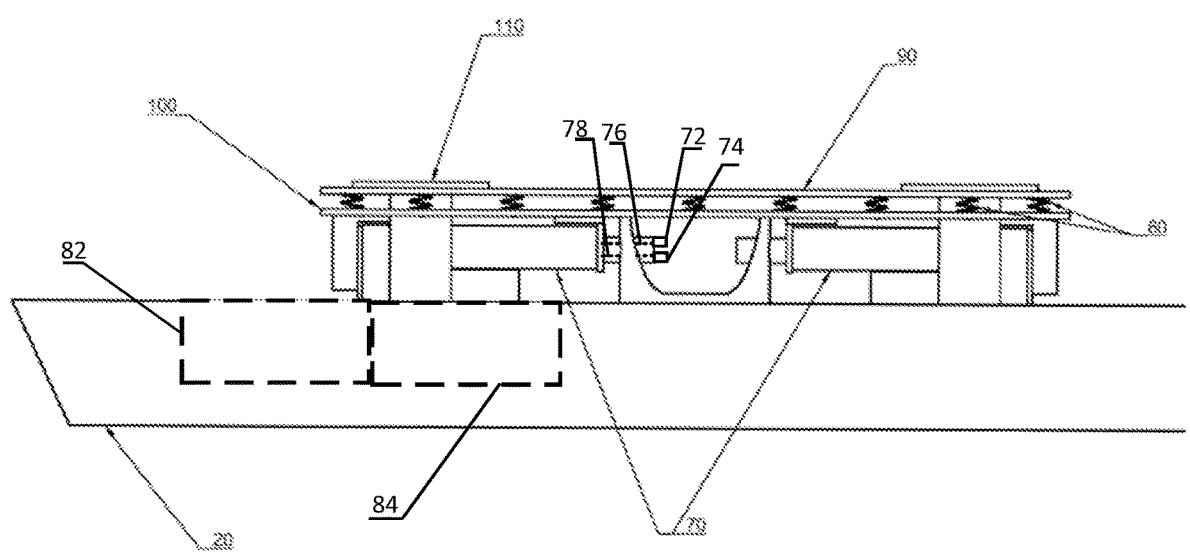
FIG. 4 is a schematic showing a side view of the docking platform (20) as well as the docking collar mechanism. In aspects, the docking collar consists of a bottom plate (100), top plate (90), and springs (80) between both plates, such as along their edges. The bottom plate (100) can be fixed to, for example, a set of four columns. The top plate (90), in aspects, is not fixed to the docking platform columns (110), but supported by the set of springs (80) along with plates fixed to each column to create tension via the springs (80) to hold the top plate (90) in place.
Figure 5:
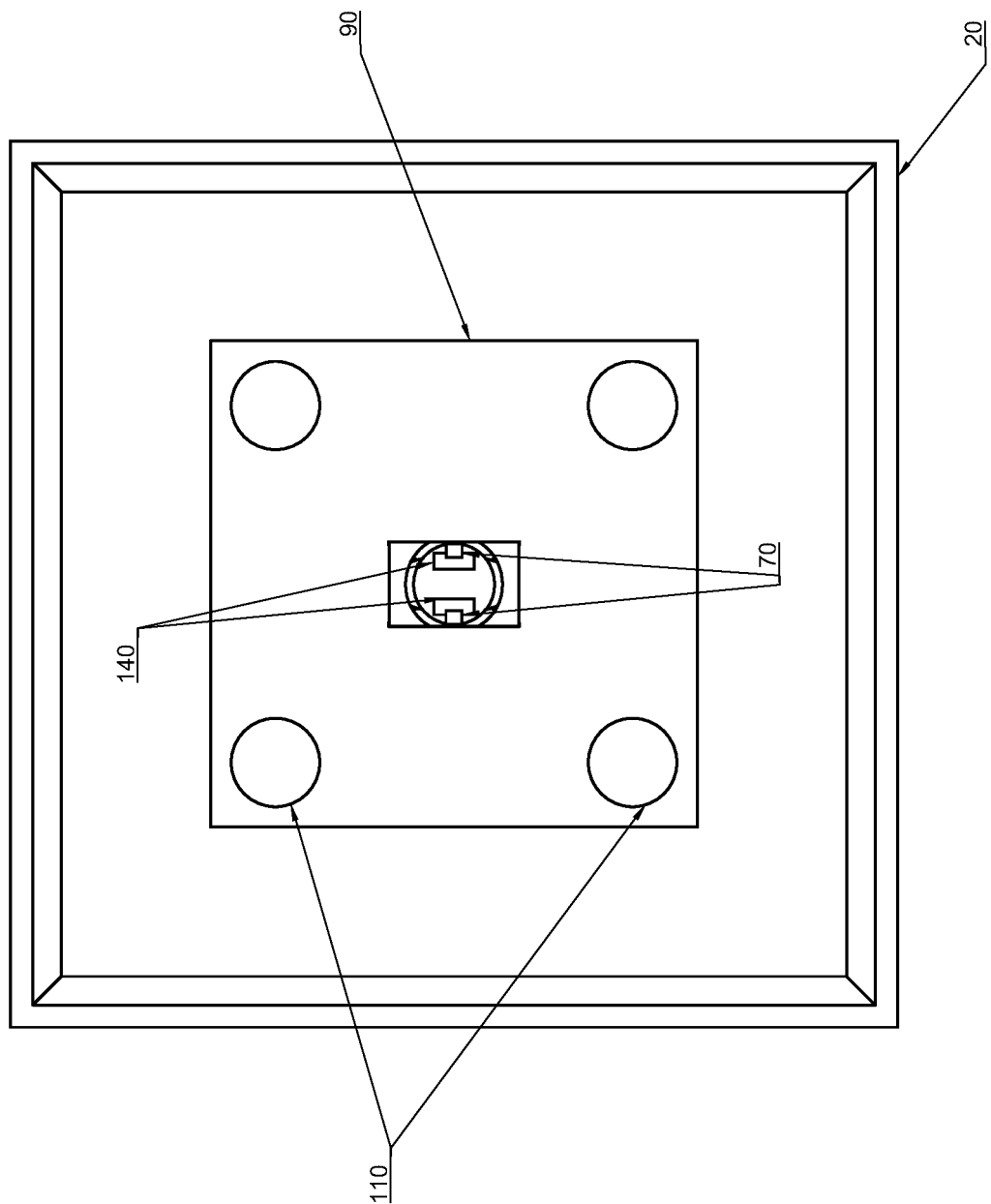
FIG. 5 is a schematic showing a top-down view of the docking platform (20). The ends of two linear actuators (70) are illustrated in their extended position when connected with the docking module (10), but can be positioned so that they minimize the travel distance to the docking module's connection slots (120). The docking platform, in aspects, houses two electromagnets that can be magnetized/demagnetized by a computer system housed, for example, in the docking platform; these can be used in combination with ferrous material (130) on the docking module (10) to assist with the docking procedure.
Figure 6:
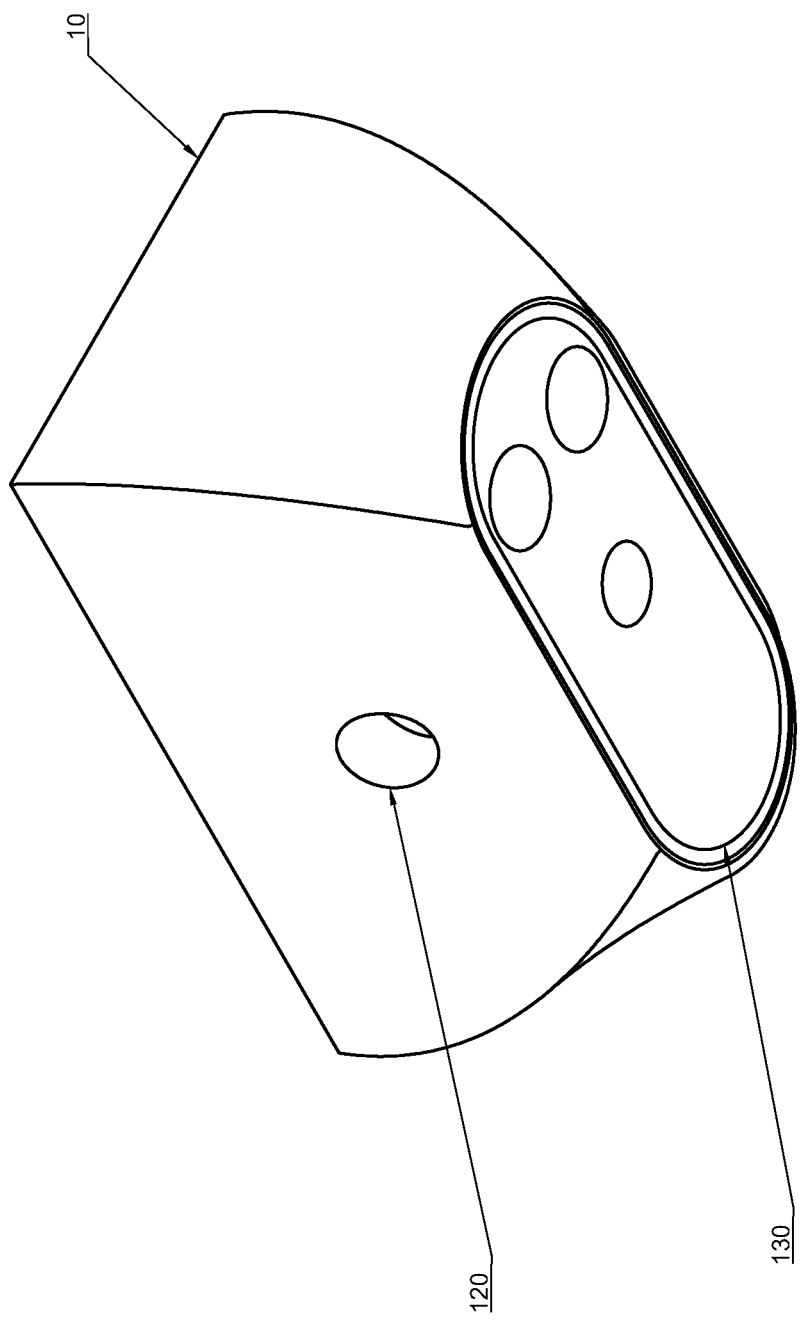
FIG. 6 shows the enclosed computerized docking module (10). The connection slots on either side of the docking module (10) can be used in combination with the docking platform's linear actuators (70) to lock or otherwise hold the docking station into place once the docking procedure is completed. On the bottom of the docking station there can be a strip of ferrous material (130) used in combination with two electromagnets (140) to assist the drone in finding its docking location, such as its precise or substantially precise docking location; this can, in aspects, also temporarily hold the docking module (10) in place for the linear actuators (70) to extend into the connection slots (120).
Figure 7:
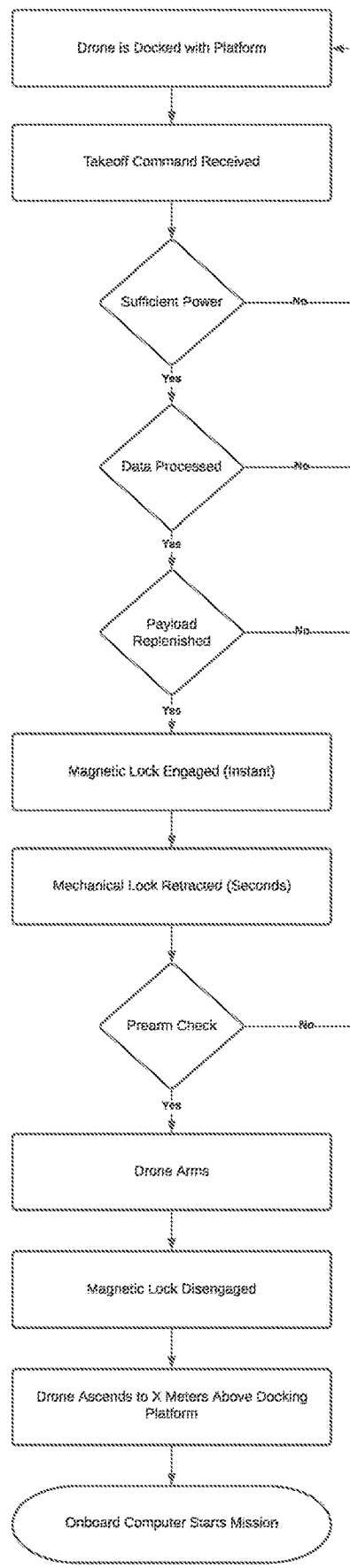
FIG. 7 is a flowchart showing an example of an undocking workflow/method/protocol according to the current invention. In the aspect shown, the drone is docked with the docking platform. A takeoff command is received by a processor on the docking platform, the docking module, the drone, or combinations thereof. If (1) adequate power is available for takeoff or liftoff or otherwise undocking and leaving the platform, (2) data to be processed, transmitted, or received is complete, and/or (3) a payload is sufficiently replenished, a lock, such as a magnetic lock, is engaged and retracted. In aspects engagement is instant, and in aspects retraction takes seconds. In other aspects, undocking can occur when the magnetic power is turned off or otherwise disengaged so that the docking module or drone is no longer magnetically connected to the platform. Next, a prearm check occurs, the drone arms, the magnetic lock is disengaged, the drone ascends to X meters above the docking platform, and a computer(s) on the drone docking module and/or the drone starts a mission. If there is insufficient power, the process starts over or stops. If data is not yet processed or fully processed, the process starts over or stops. If the payload is not sufficiently replenished, the process starts over or stops. If the prearm check is negative, the process starts over or stops.
Figure 8:
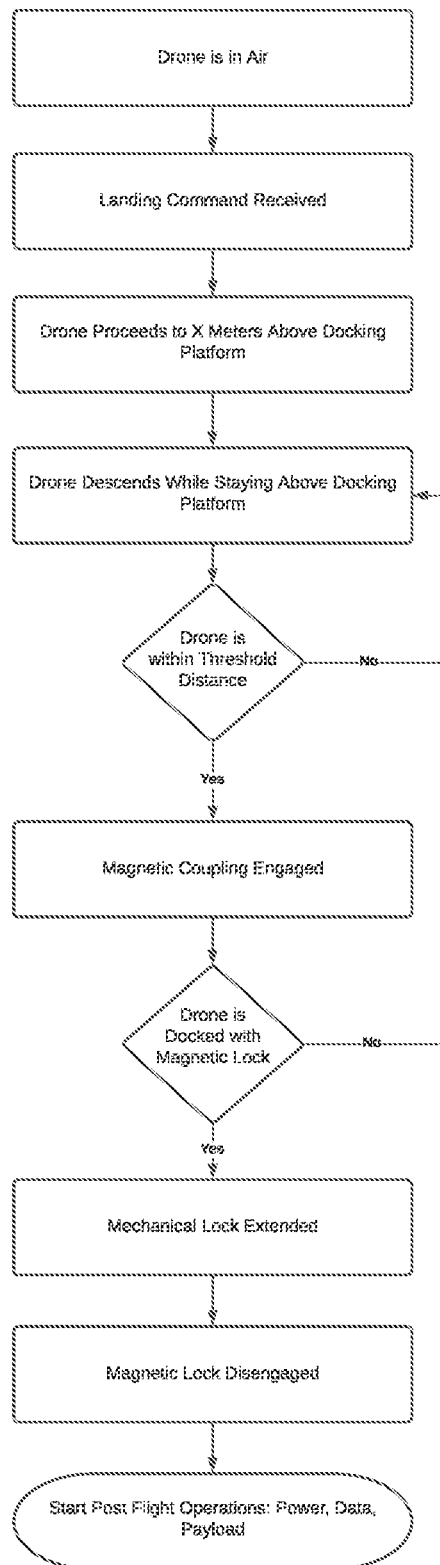
FIG. 8 is a flowchart showing an example of a docking workflow/method/protocol. In the aspect shown, the process starts with the drone in the air. A landing command is sent and/or received, and the drone proceeds to X meters above the docking platform. The drone descends while staying completely or partially above the docking platform. If the drone is within threshold or preset distance, magnetic coupling of the platform and docking module and/or drone is engaged. If the drone is not within the threshold or preset distance, the drone will be commanded to descend more or otherwise move or change position. If the drone successfully docks using the magnetic (or other) locking mechanism, in aspects, the magnetic lock is extended, the magnetic lock is disengaged, and in aspects post-flight operations begin, such as power transfer, data transfer, data processing, payload replenishment, or combinations thereof. If the drone is not successfully docked, the drone is commanded to descend more or otherwise move or change position.

The present invention has been described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. Embodiments comprising various features may also consist of or consist essentially of those various features. Other embodiments of the invention will be apparent to those skilled in the art from consideration of the specification and practice of the invention. The description of the invention provided is merely exemplary in nature and, thus, variations that do not depart from the essence of the invention are intended to be within the scope of the invention.

All references cited in this specification are hereby incorporated by reference in their entireties.

When a drone, equipped with the computerized docking adapter described herein, needs to recharge its onboard battery and/or upload (high density) data it has collected, the onboard computer is capable of instructing the drone to return to its docking station or another compatible docking station. The computer will be interfaced to the drone's autopilot in order to give control commands appropriate for docking. In aspects, the computer will use sensor feedback such as telemetry, image, and lidar data along with a Recursive Bayesian Estimation algorithm to determine the relative position of the docking platform adapter to the drone's adapter. This will inform the system on what control commands to execute to maneuver the drone during the docking procedure.

Once the drone's adapter is guided into the mechatronic docking station adapter, an actuator will activate, securing the drone in place and making the power connection for charging and the data connection for uploading collected data.

For the first phase, in embodiments, the internal battery charger of the docking station will connect to an external power supply, such as a standard or specially-adapted outdoor power receptacle. In aspects, wireless charging could be used, such as using a wireless power circuit or wireless charging coils. Additionally, the docking station will feature a mechanism for data retrieval and/or data transmission, such as an ethernet port for making a network connection that will be used for automated data retrieval or transmission. In aspects, the software tool for managing and configuring the data handling is on a computer or server connected to the docking station. In embodiments, software modules associated with the system described herein include applications for interfacing to the drone autopilot, software for processing telemetry and other sensor data, and a simulation environment for testing the automated control software.

In embodiments, the "smart" docking station described herein will be an autonomous recharging and data retrieval system. In aspects, the drone-side attachment is intended to be adaptable to most small-, medium-, or large-sized multicopter frames. This will allow a user to have the option of utilizing an existing drone(s) or potentially purchasing a drone custom-built for the docking station. Unlike other charging solutions, in particular embodiments, this system focuses on securing the drone with a docking mechanism instead of allowing the drone to land anywhere on a charging surface. This embodiment will be specifically useful for users who elect to install the docking platform in a non-stationary environment, such as a vehicle. In aspects, the system will include a software system for an onboard computer to autonomously control docking. In aspects, the overall system includes fabricating coupling hardware for securing a drone and making power and data connections. In aspects, the system includes a mechatronic component for locking coupling hardware in place, and the system includes, in aspects, an internal or connected battery charger and network connector, and the capability to integrate an onboard or connected computer and sensors into or with the drone docking adapter.

Mechanically Secure Docking Platform

In embodiments, the top of the docking platform contains an opening or a concave docking bay that a drone's docking module will slide into or otherwise connect to during a docking procedure. During this time period, when the aircraft is docking with the platform, an electromagnet may be employed to help guide the docking module that is connected, in aspects, beneath the aircraft, into the docking bay of the platform. The electromagnet may be charged to produce a magnetic field to attract ferrous material in the docking module to the sides or other areas of the docking bay.

In embodiments, once proximity sensors detect the docking module and alignment sensors confirm proper orientation of the docking module within the docking bay, the docking platform will wirelessly communicate with an onboard computer in or connected to the docking module that it is commencing mechanical coupling of the drone's docking module with the docking platform. Control commands may be necessary to correct or maintain the position and orientation of the drone. Motors or actuators controlled by the docking platform computer will move securing rods or other connection mechanism to couple with designated holes or areas in the docking module. Once the securing rods are fully extended into position, or the drone is otherwise secured to the docking platform, the computer in or connected to the docking platform will communicate to the computer associated with the drone's docking module that it is docked and may disarm the autopilot.

In embodiments, securing rods or securing mechanisms of the docking platform, that move into the docking bay to couple with the docking module, may have tapered ends to allow for additional error or variation in a position and orientation of the drone as it approaches and/or is docked to the docking platform. This will allow for securing rods or other securing mechanisms to assist with successful docking. In embodiments, holes or other attachment mechanisms in the docking module will also taper to match the shape of the securing rods or other mechanisms. Other mechanisms for securing on the docking platform include but are not limited to hooks, screws, clamps, ferrous material, magnets, electromagnets, hook-and-loop fastener, and dowel rod. Other mechanisms for securing the docking module include but are not limited to hooks, screws, clamps, electromagnet, magnet, hook-and-loop fastener, holes, openings, straps, and graspers.

In embodiments, on a side of the docking module, a hole(s) for a securing rod will include a pressure sensor that when pushed by the securing rod during the docking process will inform the onboard or connected computer that the securing rod is in the locked position. On another side of the docking module, a same or different hole(s) will have a similar pressure sensor in addition to a power connector and data connector, in cases a female power connector and female data connector. The securing rod on this side of the docking bay will be outfitted with a power connector and data connector, such as a male power connector and male data connector. The power and data connections can be made, in aspects, as the securing rod or other securing mechanism is moved into a locked position.

Once the onboard or connected computer in the docking module and the computer in or connected to the docking platform both agree/confirm that the drone is docked, the system state will change so that the aircraft disarms, the battery charger is activated, and the data logistics routine starts, for example.

Automated Battery Recharging System

The objective of this feature of the system is to recharge the power source of the drone.

In embodiments, the docking platform will have a compatible battery charger contained within or connected to the platform's structure. This charger can be connected to an external power source, such as a typical wall outlet or a high capacity battery. The connector for the power charger, in aspects, will be exposed on a side or top of the platform structure, or it may be contained within the structure and exposed to a drone or docking module when a drone docks with the platform/station. In aspects, wireless charging can be used.

Once a drone is securely docked, a power connection is made between the drone's power source and the docking platform. The docking platform's securing rod or other securing mechanism may contain a cable for the power connection and may connect to a power terminal of the docking module. In other aspects, the power connection mechanism is separate from the securing mechanism. A power cable or connector inside or connected to the docking module will, in aspects, connect to a double throw relay. In embodiments, a common terminal of the double throw relay may be connected to the drone's power source, normally-closed contacts of the relay connect with the drone's power distribution board, and the normally-open contacts of the relay connect with a terminal that mates with the securing rod's or power connector's power terminal, which feeds into the platform's internal charging system. The drone's onboard or connected computer, which in cases will now be powered by the docking platform, will actuate a switch in the double throw relay causing the circuit of the drone's power distribution board to be open and the circuit of the charging station to be closed. At this point the battery charger of the platform will start charging the drone's battery. Once the battery has been charged, the system state will update to indicate that the drone no longer needs to be docked with respect to the recharging process. If the aircraft is otherwise ready to continue its mission, recharging is complete, data transfer is complete, and/or all processes are complete, the drone will disengage from the docking platform and take off Automated Battery Quick Change System The objective of this feature is to change the power source of the drone without direct human intervention. This will allow the drone to disembark without waiting for its power source to be recharged.

For this aspect of the system, the drone's battery will preferably be contained in the docking module. The drone's power distribution board will connect to the docking module, which will be connected to the battery. The battery may use, for example, a snap connector to connect to the docking module.

Once the drone is securely docked, a power connection can be made between an auxiliary circuit inside or connected to the docking module and the docking platform. The auxiliary circuit can be used to power an onboard computer or other electronics, as well as motors or actuators used for opening or otherwise manipulating the docking module. In aspects, a battery inside the docking module can be removed by a robotic manipulator housed in, connected to, or associated with the docking platform. This manipulator, in aspects, will grip or otherwise attach to the battery, remove and/or disconnect the battery, and then, in some cases, place the battery in a charging port also housed within, connected to, or associated with the docking platform. The robotic manipulator will then grip or attach to a charged battery and place the battery in the drone, and/or connect the battery to the drone, such as by using snap connectors inside or connected to the docking module. At this point, in aspects, the onboard or connected computer will activate the actuators of the door in order to close it. In other aspects, a manipulator is not necessary; for example the drone would land on or near a battery, or a motor or actuator could place the battery in the drone. In aspects, a door is not necessary and the onboard or connected computer will instruct the drone to depart once the battery is successfully switched.

Once the battery has been replaced, the system state will update to indicate that the drone no longer needs to be docked with respect to the quick change process. If the drone is otherwise ready to continue its mission, the aircraft will disengage from the docking platform and take off Automated Data Logistics System The objective of this feature is to move data or information, such as large amounts of collected high-density data, from a storage device on the drone, such as a storage device connected to the onboard or connected computer. In aspects, the onboard computer is in the drone or in the docking module. In other aspects, data or information is transferred to the drone or onboard or connected computer associated with the drone. In cases, data from the drone storage device is connected to a computer or another storage device in or connected to the docking platform. This allows for collecting additional data on the drone's next mission.

In embodiments, once the drone is securely docked, a data connection is made between the onboard or connected computer in the docking module or drone and the docking platform. The connection may be wired or wireless, and, in cases, the data transfer can occur when the drone is not secured to the docking station, including when a drone is hovering near the station. In embodiments, a data connector in or connected to a docking bay is wired to the computer in or connected to the docking platform. Dedicated software daemons running on both the docking platform's associated computer and the docking module's or drone's computer will negotiate the connection and start the data transfer process. The two computers will verify with one another when a file is transferred and then the docking module or drone computer will remove its copy from its storage device. Data transfer progress will be shared by the docking platform's computer with any subscribed computer process. This information can be displayed or transmitted to a user who may want to monitor the process.

Once data has been transferred from the docking module or drone computer to the docking platform computer, the system state will update to indicate that the drone no longer needs to be docked or connected (by wire or wirelessly) with respect to the data transfer process. A similar process will be realized if data being sent to the drone is complete; for example, data sent to the drone may be instructions of another mission or flight plan. If the drone is otherwise ready to continue its mission, the aircraft will disengage from the docking platform and take off Automated Payload Replenishing System In embodiments, an objective of this feature is to completely or partially replenish the drone's expended payload, such as water, pesticide, nitrogen, fertilizer (or any solid, liquid, gas, material, product, component, thing, object, article, item, device, machine, etc.). Once the drone's payload container(s) are sufficiently refilled, the drone may continue delivering the payload to the intended targets. In aspects, the onboard computer is in the drone or in the docking module or both. In other aspects, the payload is measured by a sensor in the payload container(s) that is read by an onboard computer.

For this aspect of the system, the drone's payload delivery container(s) will preferably be attached or connected to the drone, such that, in aspects, the container(s) can be accessed from the top in order to gravity feed the containers with the new payload. In aspects, new or additional payload can be pumped, fed, pushed, guided, and/or lifted into the container(s).

Autonomous Guidance System for Landing and Docking

A housing containing an onboard computer system and sensors can be attached underneath the drone, although it may be located elsewhere on the drone. The sensors, such as a monoscopic camera and a lidar, may be pointed downward through designated holes or openings in the bottom of the housing; these sensors will provide streams of data to the onboard or connected computer. In aspects, this data is used to calculate the relative position of the docking module or drone with the docking platform. This calculation may be made using Recursive Bayesian Estimation, which uses incoming observations from the sensors and a mathematical process model of the drone to estimate the position and orientation of itself and the docking platform. This calculation is done at every time step W, where the frequency of W is typically between 5 Hz to 30 Hz.

With estimates of the drone's position and orientation and the docking platform's position and orientation being calculated many times a second, in examples, the onboard or connected computer computes and sends guidance commands to the drone's autopilot. In aspects, a physical connection to the autopilot will be at the top of the docking module, although it can be a wireless connection and at other areas of the docking module. This data connection will interface with the onboard or connected computer in order for control commands to be issued to the autopilot. A flight strategy for docking may entail the drone approaching the docking platform with some height above the platform h. The drone will then position itself above the platform with some lateral error $१f\backslash$ . Then the aircraft will descend towards the platform while continuously correcting its lateral position in an effort to minimize $१f\backslash$ .

Detection of the landing platform will be accomplished, in examples, by using a visually distinctive pattern in the center of the docking bay. This pattern may feature concentric circles so that geometry is detectable via a monoscopic camera when the aircraft is close to the docking bay. The detection algorithm may detect the geometry using classical computer vision techniques or by utilizing a machine learning approach by training on a data set of images created either synthetically or manually. This will be used to determine the lateral (x-y plane) position of the landing platform.

Altitude difference (z dimension) between the drone and the docking platform may be measured using a rangefinder, such as a lidar system. This data may be fused with other sensor data, from a source such as a high-accuracy RTK GPS system. This data may be filtered before the sensor fusion step to reduce noise in the collected observations. Once the docking module is observed to be within or able to be docked with the docking platform, the mechanical docking mechanism will engage to dock the drone with the platform.

Autonomous Guidance System for Undocking and Take-off

Once the system determines it is appropriate for the drone to undock and takeoff, either by battery charging and data logistics status or by user input, the onboard or connected computer in the docking module or drone will arm or engage the drone's autopilot and the computer in or connected to the docking platform will initiate undocking, for example by retraction of the securing rods. When the platform's computer detects that the securing rods or other mechanisms are retracted or disengaged, it will communicate with the docking module or drone computer this status update so that it can take off and clear the docking platform area.

When the onboard or connected computer in the docking module or drone detects that the autopilot is armed/engaged, it may send a guidance command to the autopilot to increase its velocity in the z dimension (around e.g. 0.5 m/s) until the aircraft reaches an appropriate distance above the docking platform. At this point the aircraft will be cleared of the docking platform and will maintain its position or start executing its mission.

Retrofitted to Existing Drones

The support structure to connect the docking module to the drone may vary per use case. In embodiments, a standardized connecting mechanism will allow for three-dimensional ("3D") printed custom parts to connect or attach the docking module with, for example, a bottom part of a chassis for varying drones.

Scale to Different Size Drones

The system herein allows for multiple spring-loaded or hydraulic supported landing gear feet to surround the docking module to be used to cushion the descent of the drone when docking and then also support the weight of the drone against the top of the docking platform. These supports may be located at a distance from the docking module to spread the distribution of weight across the platform while considering the balance of the drone when docked or docking.

Soft Landing

The objective of this feature is to account for repeated stress that the docking module would otherwise endure during the docking process. The docking module may use a flexible joint in the docking module arms that connect the chassis of the drone to the docking module. A spring system or similar system will absorb the kinetic energy generated when the docking module comes into physical contact with the docking bay.

EXAMPLES

Simulation environment: A simulation environment may be built using Unreal Engine 4.24+, a real-time 3D creation platform developed by Epic Games, along with AirSim, a simulator for drones developed by Microsoft AI & Research. These two tools will provide a detailed physics engine, high fidelity visualization, and can interface directly with a drone's autopilot to execute control commands using the autopilot's firmware. The simulation will act as a development environment for the autonomy software modules, which include control, perception, and localization. These software modules will enable the drone to autonomously dock and undock with the docking platform.

Control software: In aspects, the control software module will manage the communication with the drone's autopilot. This control relates to how the drone will maneuver programmatically. The high-level component of the control software module will determine what control commands to issue to the autopilot. This module will rely on data from the perception and localization software modules.

Perception software: The perception software module will process data from the cameras, lidar, and the localization module to create and manage a representation of the surrounding environment. It will be responsible for detecting the docking station and recursively updating its belief state of its relative position. The docking station detection may use TensorFlow, a software library developed by the Google Brain team used for machine learning, by way of example.

Localization software: The localization software module will process telemetry data from the autopilot's inertial measurement unit (IMU) and GPS. This data will be smoothed by applying a Bayes filter to the data to estimate the drone's physical location in its environment.

Coupling components: These two hardware components will be fabricated to mate and lock with each other. In embodiments, one component will be attached to the top or other area of the docking station platform, whereas the other component will be attached underneath the center of the drone, for example. The shape will be designed such that as the drone is close to docking, the docking station's adapter will guide the drone to the center of the dock. These components can be designed in a CAD system and can be 3D printed or otherwise fabricated.

Docking platform: The docking station will, in embodiments, be a stationary platform that will house or be connected to the battery charging and networking equipment. Atop of the landing platform, there will be one of the two coupling components used for docking, by way of example.

Drone docking module: The other coupling component will be fixed to underneath the center of the drone, or other areas of the drone. This adapter can serve multiple uses. The first is to mate with the docking station coupling component to secure the drone in place. The second is to house a small computer or computer processing unit with connected sensors such as a camera and lidar; the data from these sensors will be used for informing the drone of the relative position of the docking location. The third is to provide a power connector for charging and/or a data connection for retrieving and/or sending data.

Onboard or connected computer integration: The onboard or connected computer will be capable of running computer vision algorithms in parallel with multiple neural networks for image segmentation and object detection. Sensors such as cameras and lidar will be connected to and mounted alongside the onboard computer, if the computer is on the drone, in the drone-side docking assembly, for example. The onboard or connected computer will also interface with the drone autopilot to retrieve telemetry data and to issue control commands.

Tuning/Validation: This task includes measuring error or variation in the drone's position estimate vs. ground truth during docking under ideal and non-ideal conditions such as high wind, shadows, sun glare, and twilight. Differing velocity profiles will be evaluated for success rate, time-to-completion, and robustness in non-ideal environment conditions. Any failure cases will be evaluated and addressed during this stage.

In aspects herein, a mechanical connection, in aspects, may be made on either side of the docking module, or multiple sides or areas of the docking module. In embodiments, rods or other mechanisms can secure the docking module, and such rods or other mechanisms can be moved via motors or actuators that may be controlled by a computer housed in or connected (wirelessly or by wire) to the docking platform (or the docking module, in aspects). In further aspects, one or more sensors can interface with the computer to signal, for example, whether the docking module and/or drone is in the correct or adequate position and orientation, and/or other information related to the drone, docking station, docking module, and/or docking system. In embodiments, a docking module houses an onboard computer (or is otherwise connected via wire or wirelessly to a computer), as well as sensors for, in examples, performing an autonomous docking. In aspects, camera and/or lidar sensors will be pointing downward in order to align a drone with a docking platform according to embodiments described herein during a docking procedure. In aspects, the invention and system described herein allows for some error or variation during the process of the docking module coupling with the docking platform and/or drone.

Embodiments of the invention also include a computer readable medium comprising one or more computer files comprising a set of computer-executable instructions for performing one or more of the calculations, steps, processes and operations described and/or depicted herein. In exemplary embodiments, the files may be stored contiguously or non-contiguously on the computer-readable medium. Embodiments may include a computer program product comprising the computer files, either in the form of the computer-readable medium comprising the computer files and, optionally, made available to a consumer through packaging, or alternatively made available to a consumer through electronic distribution. As used in the context of this specification, a "computer-readable medium" is a non-transitory computer-readable medium and includes any kind of computer memory such as floppy disks, conventional hard disks, CD-ROM, Flash ROM, non-volatile ROM, electrically erasable programmable read-only memory (EEPROM), and RAM. In exemplary embodiments, the computer readable medium has a set of instructions stored thereon which, when executed by a processor, cause the processor to perform tasks, based on data stored in the electronic database or memory described herein. The processor may implement this process through any of the procedures discussed in this disclosure or through any equivalent procedure.

In other embodiments of the invention, files comprising the set of computer-executable instructions may be stored in computer-readable memory on a single computer or distributed across multiple computers. A skilled artisan will further appreciate, in light of this disclosure, how the invention can be implemented, in addition to software, using hardware or firmware. As such, as used herein, the operations of the invention can be implemented in a system comprising a combination of software, hardware, or firmware.

Embodiments of this disclosure include one or more computers or devices loaded with a set of the computer-executable instructions described herein. The computers or devices may be a general purpose computer, a special-purpose computer, or other programmable data processing apparatus to produce a particular machine, such that the one or more computers or devices are instructed and configured to carry out the calculations, processes, steps, operations, algorithms, statistical methods, formulas, or computational routines of this disclosure. The computer or device performing the specified calculations, processes, steps, operations, algorithms, statistical methods, formulas, or computational routines of this disclosure may comprise at least one processing element such as a central processing unit (i.e., processor) and a form of computer-readable memory which may include random-access memory (RAM) or read-only memory (ROM). The computer-executable instructions can be embedded in computer hardware or stored in the computer-readable memory such that the computer or device may be directed to perform one or more of the calculations, steps, processes and operations depicted and/or described herein.

Additional embodiments of this disclosure comprise a computer system for carrying out the computer-implemented method of this disclosure. The computer system may comprise a processor for executing the computer-executable instructions, one or more electronic databases containing the data or information described herein, an input/output interface or user interface, and a set of instructions (e.g., software) for carrying out the method. The computer system can include a stand-alone computer, such as a desktop computer, a portable computer, such as a tablet, laptop, PDA, or smartphone, or a set of computers connected through a network including a client-server configuration and one or more database servers. The network may use any suitable network protocol, including IP, UDP, or ICMP, and may be any suitable wired or wireless network including any local area network, wide area network, Internet network, telecommunications network, Wi-Fi enabled network, or Bluetooth enabled network. In one embodiment, the computer system comprises a central computer connected to the internet that has the computer-executable instructions stored in memory that is operably connected to an internal electronic database. The central computer may perform the computer-implemented method based on input and commands received from remote computers through the internet. The central computer may effectively serve as a server and the remote computers may serve as client computers such that the server-client relationship is established, and the client computers issue queries or receive output from the server over a network.

The input/output interfaces may include a graphical user interface (GUI) which may be used in conjunction with the computer-executable code and electronic databases. The graphical user interface may allow a user to perform these tasks through the use of text fields, check boxes, pull-downs, command buttons, and the like. A skilled artisan will appreciate how such graphical features may be implemented for performing the tasks of this disclosure. The user interface may optionally be accessible through a computer connected to the internet. In one embodiment, the user interface is accessible by typing in an internet address through an industry standard web browser and logging into a web page. The user interface may then be operated through a remote computer (client computer) accessing the web page and transmitting queries or receiving output from a server through a network connection.

It is contemplated that the current invention could be used with vehicles other than aircraft, such as cars, trucks, vans, automobiles, boats, and floating vehicles.

One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A system for docking an unmanned aircraft drone comprising:
   a. a docking platform for the unmanned aircraft drone comprising one or more battery charger that interfaces with the unmanned aircraft drone via a power cable delivered by a securing mechanism that secures the unmanned aircraft drone to the docking platform and one or more data connectors that interface with an onboard drone computer via a network cable delivered by the securing mechanism;
   b. a computerized docking module attached to the unmanned aircraft drone, wherein the docking module comprises a charging port that interfaces with a docking platform charging device via the power cable delivered by the securing mechanism that receives and/or transfers power from the one or more battery charger, and one or more data connection port that interfaces with a docking platform computer via the network cable delivered by the securing mechanism;
   c. one or more battery in or on the unmanned aircraft drone, one or more battery in or on the docking module, or more than one battery in or on both the unmanned aircraft drone and the docking module;
   d. wherein the charging port receives and/or transfers power from the one or more battery charger to charge the one or more battery in or on the unmanned aircraft drone, the one or more battery in or on the docking module, or the more than one battery in or on both the unmanned aircraft drone and the docking module;
   e. wherein the system allows for automated recharging using the one or more battery charger to charge the one or more battery in or on the unmanned aircraft drone, the one or more battery in or on the docking module, or the more than one battery in or on both the unmanned aircraft drone and the docking module;
   f. wherein, using the one or more data connection port connected to the data connector, the system allows for automated high-density data transmission from the unmanned aircraft drone or docking module to the docking platform, or bi-directional automated data transmission between the unmanned aircraft drone or docking module and the docking platform.

2. The system of claim 1, wherein the system allows for automated replacement of the one or more battery in or on the unmanned aircraft drone, the one or more battery in or on the docking module, or the more than one battery in or on both the unmanned aircraft drone and the docking module, wherein each battery is attached to a printed circuit board that can be extracted by the securing mechanism.

3. The system of claim 1, further comprising an autonomous guidance system for landing the unmanned aircraft drone on the docking platform, docking the unmanned aircraft drone on the docking platform, and/or locking the unmanned aircraft drone to the docking platform, wherein the autonomous guidance system includes one or more sensors to determine control commands for maintaining a relative position to the docking station while docking, the sensors including at least one of: a monoscopic camera and an optical distance measurement sensor.

4. The system of claim 1, further comprising an autonomous guidance system for undocking and/or unlocking the unmanned aircraft drone from the docking platform, and takeoff or liftoff of the unmanned aircraft drone, wherein the autonomous guidance system includes one or more sensors to determine control commands for maintain a relative position to the docking station while docking, the sensors including at least one of: a monoscopic camera and an optical distance measurement sensor.

5. The system of claim 1, wherein a single the docking module interfaces, docks, attaches to, or connects to a plurality of unmanned aircraft drones.

6. The system of claim 1, wherein the docking module is restricted to interfacing, docking, attaching to, or connecting with only the unmanned aircraft drone.

7. The system of claim 1, wherein the docking platform further comprises one or more of networking equipment, networking equipment for handling data logistics, a computer, a processor, a computer for monitoring power and/or data transfer and/or receipt, a container for holding a solid, liquid, or gas refilling a payload delivery system or container of the unmanned aircraft drone, or combinations thereof.

8. The system of claim 7, wherein the computer or processor controls an automated operation of a mechatronic coupling mechanism.

9. The system of claim 1, wherein the docking module is fixed to the unmanned aircraft drone or releasably attachable to the unmanned aircraft drone.

10. The system of claim 1, wherein data received from the unmanned aircraft drone or docking module by the docking platform is sent to or shared with a remote electronic device.

11. The system of claim 10, wherein the remote electronic device is chosen from one or more of a computer, a processor, a controller, a phone, a smart phone, a tablet computer, a laptop computer, a desktop computer, a server, a cloud-based system, another docking platform, another unmanned aircraft drone, another docking module, or combinations thereof.

12. The system of claim 1, wherein data received from the docking platform by the unmanned aircraft drone or docking module is sent to or shared with a remote electronic device.

13. The system of claim 12, wherein the remote electronic device is chosen from one or more of a computer, a processor, a controller, a phone, a smart phone, a tablet computer, a laptop computer, a desktop computer, a server, a cloud-based system, another docking platform, another unmanned aircraft drone, another docking module, or combinations thereof.

14. The system of claim 1, wherein data from a remote electronic device is sent directly to the docking module, or wherein data is sent from a remote electronic device to one or more processor in or on the docking platform and the data is transferred to the docking module using the one or more data connection port and/or antenna.

15. The system of claim 1, the docking platform including one or more payload delivery tank that interfaces with an onboard drone tank of the unmanned aircraft drone via a hose delivered by the securing mechanism.

* * * * *